United States Patent

Kawakami et al.

(10) Patent No.: US 8,190,329 B2
(45) Date of Patent: May 29, 2012

(54) STEERING RETENTION STATE JUDGING DEVICE, DRIVER WAKEFULNESS PREDICTING DEVICE, AND CORRECT COURSE KEEPING DEVICE (75) Inventors: Kenta Kawakami, Utsunomiya (JP); Yoshihiro Urai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1115 days.

(21) Appl. No.: 12/045,371

(22) Filed: Mar. 10, 2008

(65) Prior Publication Data

US 2008/0262676 A1 Oct. 23, 2008

(30) Foreign Application Priority Data

Mar. 12, 2007 (JP) ................................. 2007-061502

(51) Int. Cl.
*G06F 19/00* (2011.01)

(52) U.S. Cl. .............. 701/41; 701/42; 701/43; 340/575; 340/576

(58) Field of Classification Search .............. 701/41–43; 340/575, 576

See application file for complete search history.

(56) References Cited

U.S. PATENT DOCUMENTS

| 5,878,362 | A  | * | 3/1999  | Sekine et al. .................. 701/41  |
| 5,928,299 | A  | * | 7/1999  | Sekine et al. .................. 701/41  |
| 6,487,475 | B1 | * | 11/2002 | Yoshikawa ........................ 701/1 |
| 7,096,994 | B2 | * | 8/2006  | Kim ............................. 180/446 |
| 7,127,341 | B2 | * | 10/2006 | Whang .......................... 701/43   |
| 7,138,923 | B2 | * | 11/2006 | Ferrone et al. ................ 340/576  |
| 7,302,327 | B2 | * | 11/2007 | Kudo ............................ 701/41  |
| 7,427,924 | B2 | * | 9/2008  | Ferrone et al. ................ 340/576  |
| 2004/0133324 | A1 | * | 7/2004 | Yasui et al. ..................... 701/41 |
| 2005/0021204 | A1 | * | 1/2005 | Kudo .............................. 701/36 |

FOREIGN PATENT DOCUMENTS

JP 2005-119539 A 5/2005

* cited by examiner

*Primary Examiner* — Anne Marie Boehler
*Assistant Examiner* — Michael Stabley
(74) *Attorney, Agent, or Firm* — Arent Fox LLP (57) ABSTRACT This steering wheel retention state judging device includes: a torque application unit that applies a torque on a steering wheel of a vehicle, the steering wheel operated by a driver; an angle sensor that detects a steering angle of the steering wheel; and a steering wheel retention state judging unit that judges a retention state of the steering wheel by the driver based on the steering angle of the steering wheel when the torque is applied by the torque application unit.

11 Claims, 7 Drawing Sheets

STEERING RETENTION STATE JUDGING DEVICE, DRIVER WAKEFULNESS PREDICTING DEVICE, AND CORRECT COURSE KEEPING DEVICE

BACKGROUND OF THE INVENTION

Priority is claimed on Japanese Patent Application No. 2007-61502 filed Mar. 12, 2007 the contents of which are incorporated herein by reference.

1. Field of the Invention

The present invention relates to a steering retention state judging device, a driver wakefulness predicting device and a correct course keeping device.

2. Description of Related Art

Technology to predict driver's driving state from steering quantities (steering torque, steering angle, and so on) in a vehicle has been proposed. For example, according to the Japanese Unexamined Patent Application, First Publication No. 2005-119539 technology is disclosed for predicting in advance a slip of a driver's hand during steering operation, by calculating the gripping force of the hands of the driver holding the steering wheel, and by calculating counter-force of the steering wheel, and making the prediction based on the gripping force and the counter-force.

Many examples of traffic accidents have been observed as a result of acknowledgment errors or judgmental errors made by drivers driving in a state of low wakefulness. Thus, development of technology to judge the state of wakefulness of drivers is desired.

However, prior arts to estimate the driving state proposed until now, including the art disclosed in the Japanese Unexamined Patent Application, First Publication No. 2005-119539 generally estimate the driving state passively based on data obtained from steering behavior. According to such prior art, if the driver does not operate the steering wheel, the required data cannot be obtained. The problem here is that on straight roads where the frequency of driver operating the steering wheel is small, considerable time is required to recognize the driving state of the driver.

Thus, a first object of the present invention is to provide a steering retention state judging device that can accurately judge the steering retention state of the driver.

A second object of the present invention is to provide a driver wakefulness predicting device that can estimate the wakefulness of the driver accurately.

Moreover, a third object of the present invention is to provide a correct course keeping device that can accurately maintain the correct course.

SUMMARY OF THE INVENTION (1) To achieve the first object, the present invention provides a first steering wheel retention state judging device including a torque application unit that applies a torque on a steering wheel of a vehicle; an angle sensor that detects a steering angle of the steering wheel; and a steering wheel retention state judging unit that judges a retention state of the steering wheel by the driver, based on the steering angle of the steering wheel when the torque is applied by the torque application unit.

According to the invention mentioned above, even on straight roads with small frequency of operation of the steering wheel, torque is applied on the steering wheel by the torque application unit and the steering wheel is operated such that the torque applied by the driver is canceled. At this stage, a difference occurs in the steering angle because the gripping force on the steering wheel by the driver differs. Consequently, the steering retention state of the driver can be judged accurately based on the steering angle when torque is applied.

(2) In the first steering wheel retention state judging device of the present application, the steering wheel retention state judging unit may judge that the driver does not retain the steering wheel normally when a change in steering angle or a change in steering angle per unit time, in response to the torque applied by the torque application unit, becomes equal to or greater than a predetermined value.

In this case, if the change in steering angle or the change in steering angle per unit time in response to applied torque is large, the operation of steering wheel by the driver is small; so the driver can be judged as not retaining the steering wheel normally. Consequently, the steering retention state of the driver can be judged accurately.

(3) To achieve the second object mentioned above, the invention according to the present application provides a driver wakefulness estimating device including: the first steering wheel retention state judging device; a memory device that stores a plurality of the changes in steering angle or the changes in steering angle per unit time, in response to the torque applied by the torque application unit; and a driver wakefulness estimating unit that estimates the driver's wakefulness as being decreased when the change in steering angle or the change in steering angle per unit time, in response to the torque applied by the torque application unit, increases over a period of time.

According to the invention mentioned above, the normality of the steering retention state of the driver shows a decreasing trend and the driver wakefulness is judged as having decreased when a change in steering angle or a change in steering angle per unit time accompanying the applied torque increases over a period of time. Consequently, the wakefulness of the driver can be estimated accurately.

(4) To achieve the second object mentioned above, the invention according to the present application provides a driver wakefulness estimating device including: a first steering wheel retention state judging device; a driver wakefulness estimating unit that estimates the driver's wakefulness as being decreased when the change in steering angle or the change in steering angle per unit time, in response to the torque applied by the torque application unit, becomes on or above a threshold value for a number of times that is greater than a predetermined number of times.

According to the invention mentioned above, when the change in steering angle or the change in steering angle per unit time accompanying the applied torque becomes greater than the threshold value for a number of times that is greater than a predetermined number of times, the driver wakefulness is judged as having decreased because the frequency of the steering wheel not retained normally is large. Consequently, the wakefulness of the driver can be estimated accurately.

(5) To achieve the first object, the present invention provides a second steering wheel retention state judging device including: a torque application unit that applies a torque on a steering wheel of a vehicle; a torque sensor that detects a steering torque of the steering wheel operated by a driver; and a steering wheel retention state judging unit that judges a retention state of the steering wheel by the driver based on the steering torque detected by the torque sensor when the torque is applied by the torque application unit.

According to the invention mentioned above, even on straight roads with small frequency of operation of the steering wheel, an external torque is applied on the steering wheel by the torque application unit, causing the driver to operate the steering wheel with a steering torque so as to cancel the externally applied torque. At this stage, a variation in magnitude of the steering torque applied on the steering wheel by the driver occurs due to the steering retention state of the driver. Consequently, the steering retention state of the driver can be judged accurately based on the steering torque when the external torque is applied.

(6) To achieve the first object mentioned above, the present invention provides a third steering wheel retention state judging device including: a torque application unit that applies a torque on a steering wheel such that a steering angle of a vehicle becomes equal to a target steering angle; a torque sensor that detects a steering torque of the steering wheel operated by a driver; and a steering wheel retention state judging unit that judges a retention state of the steering wheel by the driver based on the steering torque detected by the torque sensor when the torque is applied by the torque application unit.

According to the invention mentioned above, even on straight roads with small frequency of operation of the steering wheel, an external torque is applied on the steering wheel by the torque application unit such that the target steering angle is achieved; therefore, the driver applies the steering torque on the steering wheel such that the externally applied torque is canceled. At this stage, a variation in magnitude of the steering torque applied on the steering wheel by the driver occurs due to the steering retention state of the driver. Consequently, the steering retention state of the driver can be judged accurately based on the steering torque when torque is applied.

(7) In the third steering wheel retention state judging device, the steering wheel retention state judging unit may judge that the driver does not retain the steering wheel normally when a change in the steering torque or a change in the steering torque per unit time, in response to the torque applied by the torque application unit, becomes equal to or smaller than a predetermined value.

In this case, if the change in steering torque or the change in steering torque per unit time accompanying applied torque is small, the steering torque is weakly applied; so the driver can be judged as not retaining the steering wheel normally. Consequently, the steering retention state of the driver can be judged accurately.

(8) To achieve the second object mentioned above, the present invention provides a driver wakefulness estimating device including: the third steering wheel retention state judging device mentioned above; a memory device that stores a plurality of changes in the steering torque or changes in the steering torque per unit time, in response to the torque applied by the torque application unit; and a driver wakefulness estimating unit that estimates the driver's wakefulness as being decreased when a change in the steering torque or a change in the steering torque per unit time, in response to the torque applied by the torque application unit, decreases over a period of time.

According to the invention mentioned above, the normality of the steering retention state of the driver shows a decreasing trend and the driver wakefulness is judged as having decreased when a change in steering torque or a change in steering torque per unit time accompanying the applied torque decreases over a period of time. Consequently, the wakefulness of the driver can be estimated accurately.

(9) To achieve the second object mentioned above, the invention according to the present application provides a driver wakefulness estimating device including: a third steering wheel retention state judging device; and a wakefulness estimating unit that estimates the driver's wakefulness as being decreased when a change in the steering torque or a change in the steering torque per unit time, in response to the torque applied by the torque application unit, becomes equal to or smaller than a predetermined value for a number of times that is greater than a predetermined number of times.

According to the invention mentioned above, when a change in steering torque or a change in steering torque per unit time accompanying the applied torque becomes smaller than the threshold value, for a number of times that is greater than a predetermined number of times, the driver wakefulness can be judged as having decreased because the frequency of the steering wheel not retained normally is large. Consequently, the wakefulness of the driver can be estimated accurately.

(10) Also, the driver wakefulness estimating device of the present application may operate the steering wheel retention state judging device to judge the steering wheel retention state when a steering frequency of the driver is on or below a predetermined value.

In this case, only when the probability that the driver wakefulness has decreased is high, the driver wakefulness estimation processing may be operated, and the sense of discomfort of the driver can be suppressed to a minimum.

(11) In the driver wakefulness estimating device of the present application, when the torque is applied by the torque application unit, a connection between the steering wheel and a vehicle wheel may be disconnected, so that the steering wheel may rotate independently of the wheel.

In this case, even when torque is applied on the steering wheel by the torque application unit, the running condition of vehicle can be maintained.

(12) Moreover, the driver wakefulness estimating device of the present application may further include an alarm device which is activated when the driver wakefulness is estimated to be decreased.

In this case, the driver wakefulness can be improved.

(13) Moreover, to achieve the third object mentioned above, the present invention provides a correct course keeping device including: any one of the first, second or third steering wheel retention state judging device mentioned above; and an alarm device or a steering control device, wherein: the alarm device or the steering control device is activated when a probability of the vehicle deviating from a correct course becomes equal to or higher than a predetermined probability; and conditions under which the alarm device or the steering control device is activated are broadened when the driver is judged as not retaining the steering wheel normally.

According to the invention mentioned above, when the driver does not retain the steering wheel normally, the vehicle can be prevented from deviating from the correct course.

(14) Moreover, to achieve the third object mentioned above, the present invention provides a correct course keeping device including: any one of the driver wakefulness estimating devices mentioned above; and an alarm device or a steering control device, wherein the alarm device or the steering control device is activated when a probability of a vehicle deviating from a correct course becomes higher than a predetermined probability, and a conditions under which the alarm device or the steering control device is activated are broadened when the wakefulness estimating unit estimates that the driver's wakefulness is decreased.

According to the invention mentioned above, a vehicle can be prevented from deviating from the correct course when the driver's wakefulness is decreased.

(15) Also, in the first steering wheel retention state judging device mentioned above, the torque application unit may apply a torque so as to cancel out the steering angle by the driver, when the amount of the steering angle is equal to or below a predetermined value.

In this case, torque can be applied for a long period continuously on the steering wheel without causing a sense of discomfort to the driver.

(16) Also, in the second or the third steering wheel retention state judging devices mentioned above, the torque application unit may apply a torque equivalent in size to the steering torque by the driver in a direction so as to cancel out the steering torque, when the steering torque is equal to or below a predetermined value.

In this case, torque can be applied for a long period continuously on the steering wheel without causing a sense of discomfort to the driver.

DETAILED DESCRIPTION OF THE INVENTION

Embodiments of the present invention will be described below referring to the drawings.
(First Embodiment, Steering Wheel Retention State Judging Device)

Figure 1:
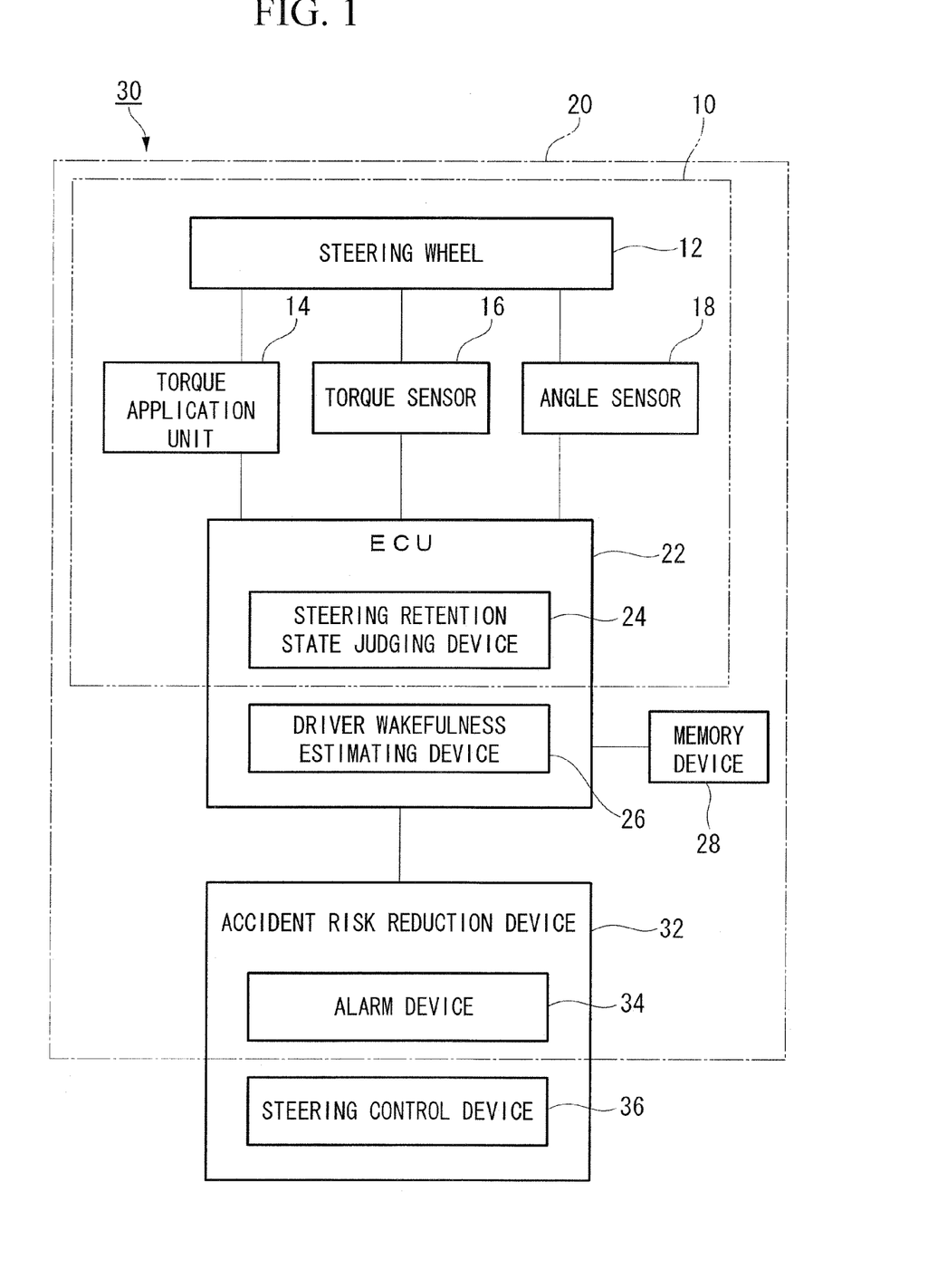
FIG. 1 is a block diagram showing a steering wheel retention state judging device, a driver wakefulness estimating device and a correct course keeping device according to the first embodiment.

FIG. 1 is a block diagram showing a steering wheel retention state judging device, a driver wakefulness estimating device, and a correct course keeping device according to the first embodiment. In the first embodiment, the driver's steering retention state is judged based on the steering angle accompanying the applied torque. A steering wheel retention state judging device 10 according to the first embodiment includes a torque application unit 14 for applying torque on a vehicle's steering wheel 12, an angle sensor 18 to detect the steering angle of steering wheel 12, and a steering retention state judging unit 24 to judge the steering retention state of driver based on the steering angle of the steering wheel 12 detected by the angle sensor 18 when torque is applied by the torque application unit 14.

Figure 2:
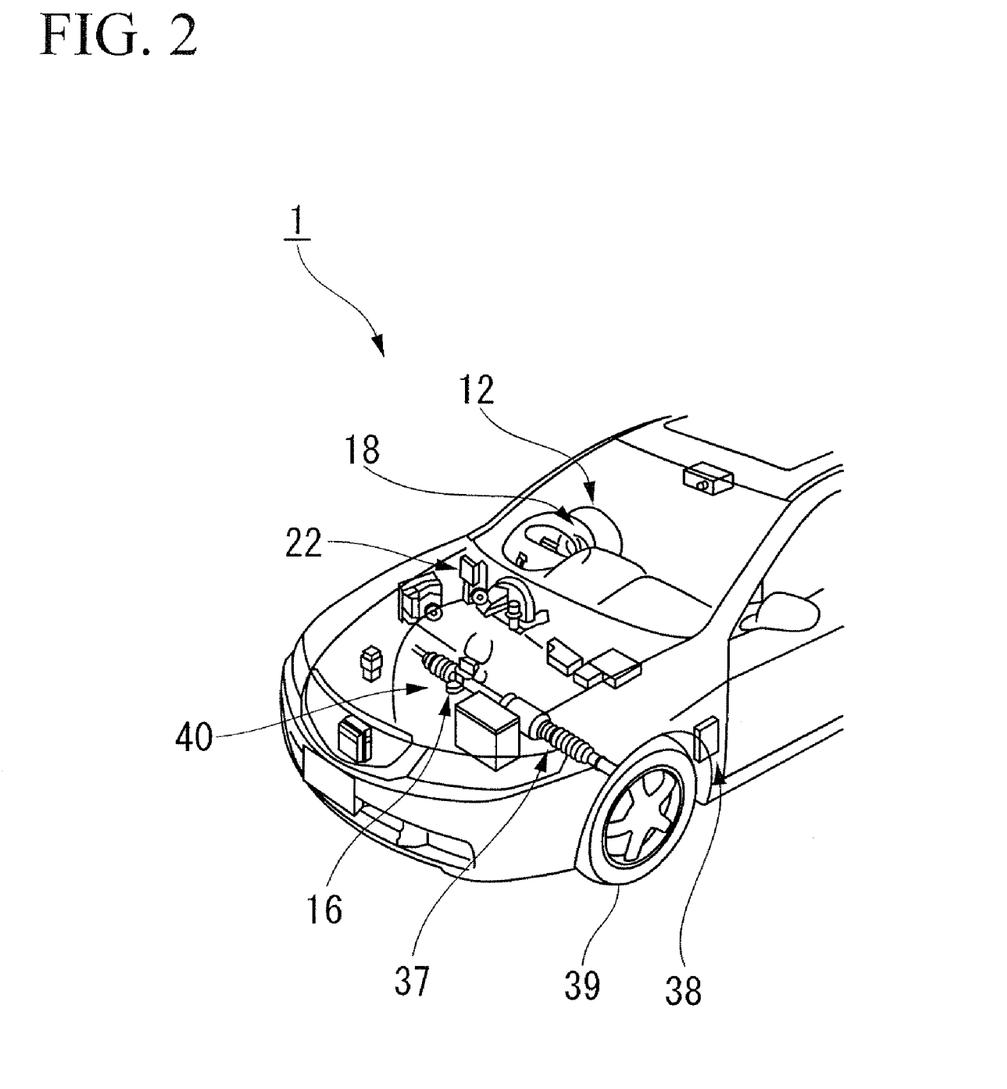
FIG. 2 is a perspective view showing the internal construction of the front part of a vehicle.

FIG. 2 is a perspective view showing the internal construction of the front part of a vehicle 1. The vehicle 1 is provided with an angle sensor 18 for detecting the steering angle of the steering wheel 12 and a torque sensor 16 for detecting the steering torque of the steering wheel 12. The vehicle 1 is also provided with a steering device 40 for driving the tire 39 according to the steering angle of the steering wheel 12. This steering device 40 includes an electric power steering device 37 that drives a motor according to the steering input by the driver and activates steering aid force. This electric power steering device 37 functions as the torque application unit 14 that applies torque on the steering wheel 12.

A steering device wherein the steering wheel 12 and tire 39 are not mechanically connected, that is, a so-called steer-by-wire steering device may be adopted. Since road surface reaction cannot be transmitted to the steering wheel 12 from the tire 39, the steer-by-wire steering device is provided with a motor and the like that applies steering feedback (torque) to the steering wheel 12 so that a natural steering feeling is provided to the driver. This motor and the like may be used as the torque application unit 14 in the present embodiment.

Torque can also be applied on the steering wheel, by controlling the tires, suspension, etc., and giving the vehicle movement in the yaw direction.

The steering wheel 12 of the present embodiment can rotate independently of the vehicle wheel. That is, the vehicle wheel movement is not interlocked with the rotation of the steering wheel 12 when torque is applied by the torque application unit 14. Accordingly, when torque is applied by the torque application unit 14 on the steering wheel, the running condition of the vehicle can be maintained. This mechanism can be easily achieved with the steer-by-wire steering device.

Returning to FIG. 1, the steering wheel retention state judging device according to the present embodiment is provided with an electronic control unit (ECU) 22. The ECU 22 transmits control signal to the torque application unit 14, the torque sensor 16 and the angle sensor 18, and also receives the steering torque detected by the torque sensor 16 and/or steering angle detected by the angle sensor 18.

The ECU 22 includes a steering retention state judging unit 24. This steering retention state judging unit 24 judges the steering retention state of the driver based on the detected steering torque and/or the steering angle, in addition to the torque applied on the steering wheel 12.
(Driver Wakefulness Estimating Device)

On the other hand, the driver wakefulness estimating device 20 according to the present embodiment is provided with a driver wakefulness estimating unit 26 installed in the ECU 22 and a storage device 28 connected to the ECU 22, in addition to the steering wheel retention state judging device 10 mentioned above. The driver wakefulness estimating unit 26 judges the wakefulness of the driver based on the change in steering angle or the change in steering angle in unit time accompanying the torque applied by the torque application unit 14. Steering angle change data in the past is stored in the storage device 28.

The driver wakefulness estimating device 20 is also provided with an accident risk reduction device 32. The accident risk reduction device 32 functions to reduce risks of traffic accidents based on the judgment of the driver wakefulness estimating unit 26. An alarm device 34 that emits alarm is provided as the accident risk reduction device 32.

(Correct Course Keeping Device)

Moreover, a correct course keeping device according to the present embodiment is provided with a steering control device 36, in addition to the driver wakefulness estimating device 20 mentioned above. The steering control device 36 is also a part of the accident risk reduction device 32, and it controls the steering wheel so as to maintain the correct course based on the judgment of the driver wakefulness estimating unit 26. A lane-keeping assist system or accident avoidance system may be used as examples of the control system.

(Steering Retention State Judging Method)

Figure 3:
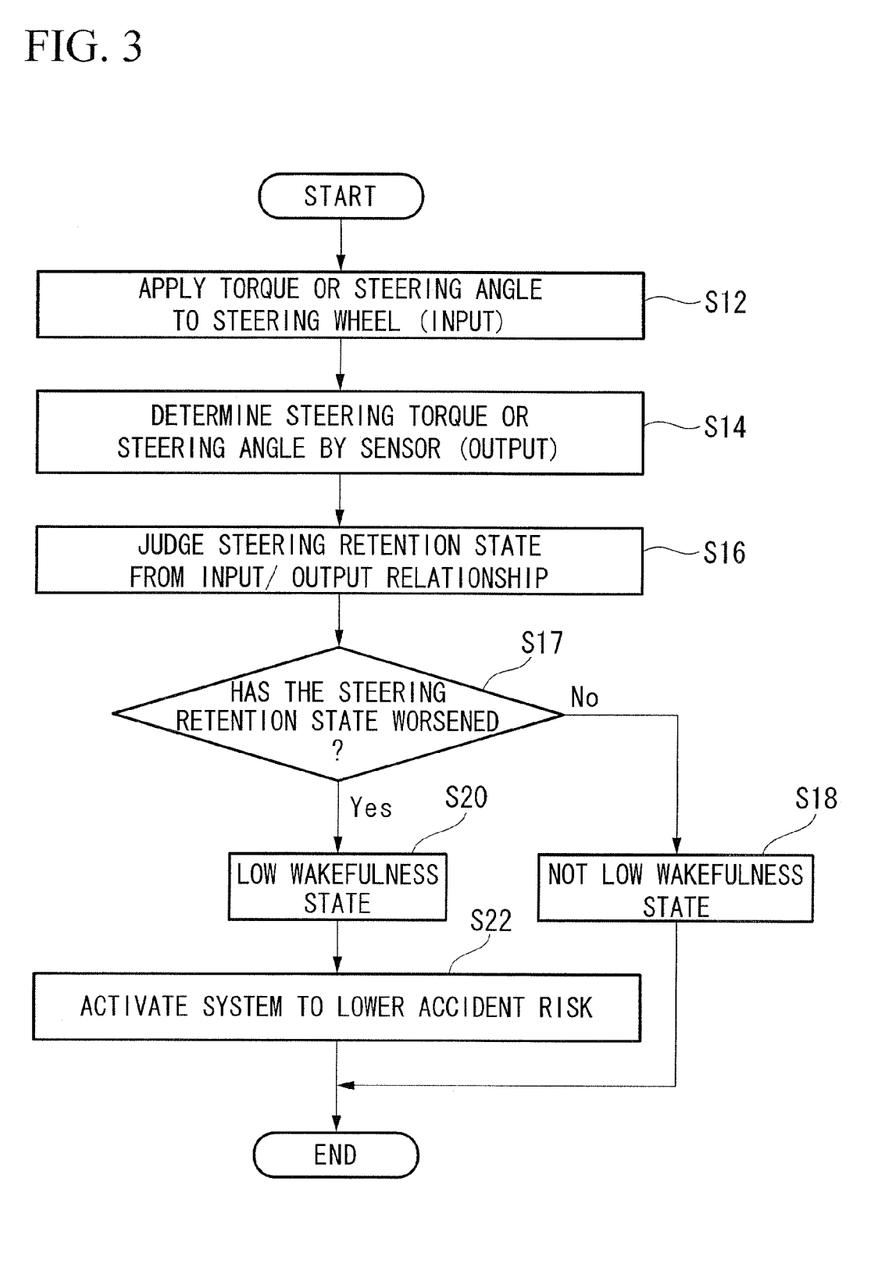
FIG. 3 is a flow chart of a steering retention state judging method, a driver wakefulness estimating method and a correct course keeping method according to the first embodiment.

Next, the flow chart of FIG. 3 is used to describe the steering retention state judging method, the driver wakefulness estimating method and the correct course keeping method according to the first embodiment.

The ECU 22 monitors the operation of the steering wheel 12 by the driver through the torque sensor 16, the angle sensor 18 and so on. When the steering frequency of the driver drops below a predetermined value, it performs steering retention state judgment processing and driver wakefulness estimation processing described hereafter. As a result, only when the probability of the steering retention state not being normal is high, and the probability of the driver's wakefulness dropped is high, the steering retention state judgment processing and the driver wakefulness estimation processing may be implemented, and the driver's sense of discomfort can be suppressed to a minimum.

Firstly, drive signal is output to the torque application unit 14 by the ECU 22, and torque (steering wheel counter-force, steering counter-force, forced torque) is applied on the steering wheel 12 by the torque application unit 14 (S12).

Figure 4A:
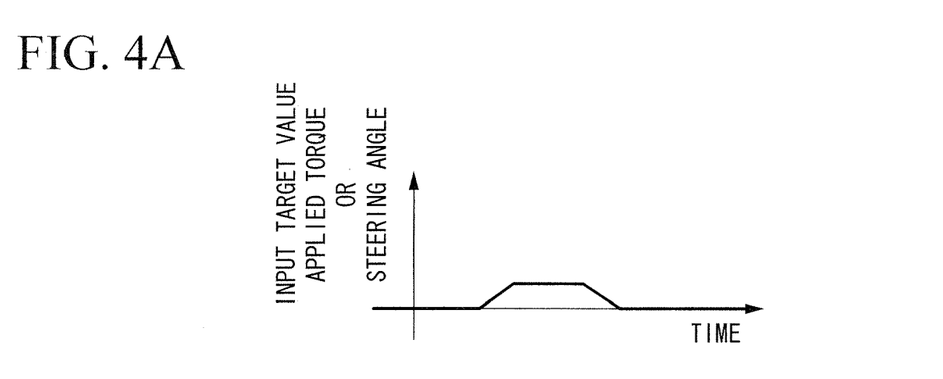
FIG. 4A is an explanatory diagram of an input waveform.
Figure 4B:
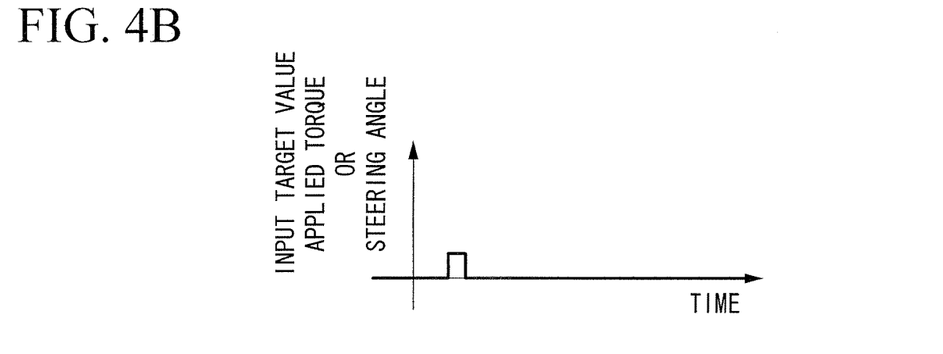
FIG. 4B is an explanatory diagram of an input waveform.
Figure 4C:
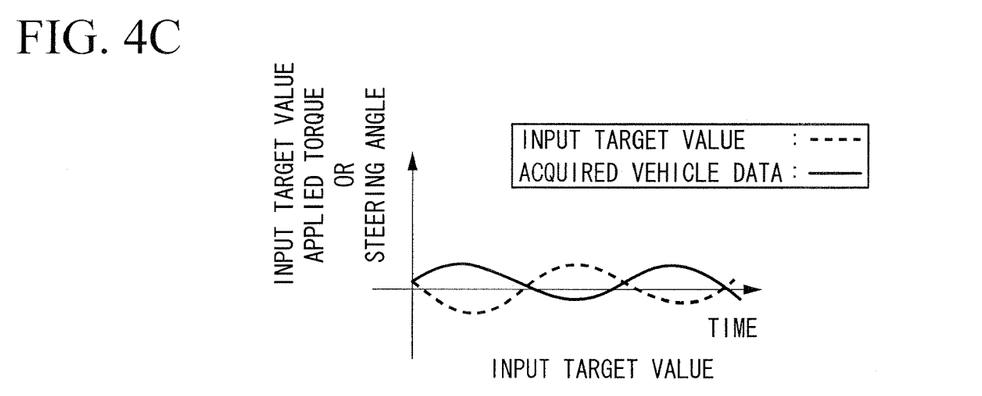
FIG. 4C is an explanatory diagram of an input waveform.

FIG. 4A to FIG. 4C are explanatory diagrams of various kinds of input waveforms. The input torque in the input waveform shown in FIG. 4 has a trapezoidal shape. That is, the steering counter-force is increased from zero to the predetermined specified value with time. Next, the steering counter-force is maintained at the predetermined specified value for the predetermined specified time only. Subsequently, the steering counter-force is decreased from the predetermined specified value to zero with time. In this way, if the input quantity of the steering counter-force is small and the gradient is small, the sense of discomfort given to the driver also reduces. In the input waveform shown in FIG. 4, the steering counter-force is input in a pulse form. In this way, if the input quantity of the steering counter-force is small and the input time is also short, the sense of discomfort given to the driver can be reduced. A steering counter-force proportional to the steering angle or the steering torque is input to the input waveform shown in FIG. 4C, in a direction opposite to the input direction of the steering angle or the steering torque to the steering wheel 12 by the driver. As a result, no sense of discomfort is caused to the driver, and torque can be applied to the steering wheel continuously for a long period.

The input waveforms of FIG. 4A to FIG. 4C can be used not only in the case when torque is applied (first and second embodiments) but also when the target steering angle is applied (third embodiment). The vertical axis in FIG. 4A to FIG. 4C are labeled as input "target" value. This is because, generally, the value is not actually achieved due to the driver's steering operation (especially when target steering angle is assigned). The control method for input waveform includes feed forward control of control quantity, feedback control of applied torque, impedance control of applied torque, feedback control of steering angle and so on; any of these methods may be used.

In each of the embodiments below, description is given taking the input waveform of trapezoidal shape as in FIG. 4A as the example.

Figure 5A:
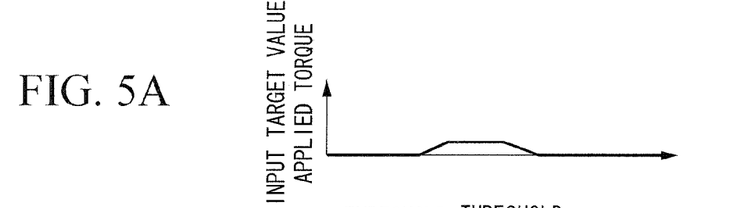
FIG. 5A is a graph showing an input waveform in the first embodiment.
Figure 5B:
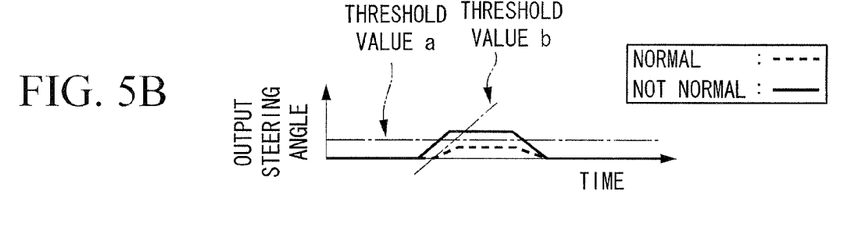
FIG. 5B is a graph showing an output waveform in the first embodiment.

FIG. 5A and FIG. 5B are graphs showing the input/output waveforms in the first embodiment. The steering wheel 12 performs circular motion when torque is applied by the torque application unit 14. More specifically, when a torque as shown in FIG. 5A is applied, the steering angle as shown in FIG. 5B is generated. The ECU 22 outputs a drive signal to the angle sensor 18, and the angle sensor 18 detects the steering angle (S14). The angle sensor 18 detects the steering angle at predetermined time points. Based on this result, the ECU 22 calculates the change in steering angle and the change in steering angle per unit time with the applied torque. The amount of change in steering angle with applied torque (hereafter referred to as "width of change in steering angle") is the quantity obtained by subtracting the steering angle before torque application from the maximum value of the steering angle when torque is applied. The change in steering angle per unit time (hereafter referred to as the "rate of change in steering angle") is the change in speed of the steering angle and is equivalent to the slope of the graph of FIG. 5B. The calculated width of change in steering angle and the rate of change in steering angle are stored in the memory device 28.

When the steering retention state of the driver is not normal, the gripping force of the steering wheel is reduced than the normal steering retention state. Accordingly, the amount of circular motion of the steering wheel 12 with the applied torque, that is, the steering angle change, becomes large, as shown by the solid line in FIG. 5B. When the torque applied by the torque application unit is larger, the width of change in steering angle, when the steering retention state of the driver is not normal, becomes larger.

The steering retention state judging unit 24 detects the steering retention state of the driver from the input/output relationship (S16). More specifically, the threshold value 'a' of the width of change in steering angle is set in advance, based on the magnitude of the applied torque by the torque application unit. The width of change in steering angle calculated by the ECU 22 and the threshold value 'a' are compared. If the width of change in steering angle is greater than the threshold value 'a', steering retention state of the driver is judged as not normal.

When the steering retention state of the driver is normal, the driver operates the steering wheel 12 in a direction so as to cancel the rotation of the steering wheel 12; therefore, the rate of change in steering angle decreases, as shown by the broken line in FIG. 5B. In contrast, when the steering retention state of the driver is not normal, the driver does not operate the steering wheel 12 in a direction so as to cancel the rotation of the steering wheel 12; therefore, the rate of change in steering angle increases, as shown by the broken line in FIG. 5B. As the torque applied by the torque application unit becomes larger, the rate of change in steering angle when the steering retention state of the driver is not normal becomes larger.

So the threshold value 'b' of the rate of change in steering angle is set in advance, based on the magnitude of the torque applied by the torque application unit. The rate of change in steering angle calculated by the ECU 22 and the threshold value 'b' are compared. If rate of change in steering angle is greater than the threshold value 'b', the steering retention state of the driver is judged as not normal. Both the judgment of steering retention state by the width of change in steering angle (threshold value 'a') and the judgment of steering retention state by the rate of change in steering angle (threshold value) may be implemented, or else, any one of the two may be implemented.

(Driver Wakefulness Estimating Method)

Next, the driver wakefulness is estimated (S17).

Figure 8:
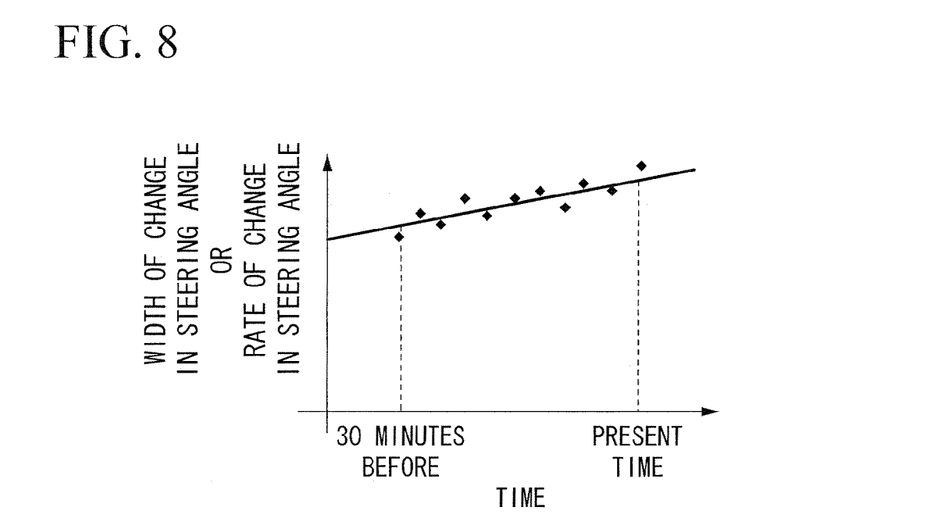
FIG. 8 is a graph showing the change with time of the steering angle variation.
Figure 9:
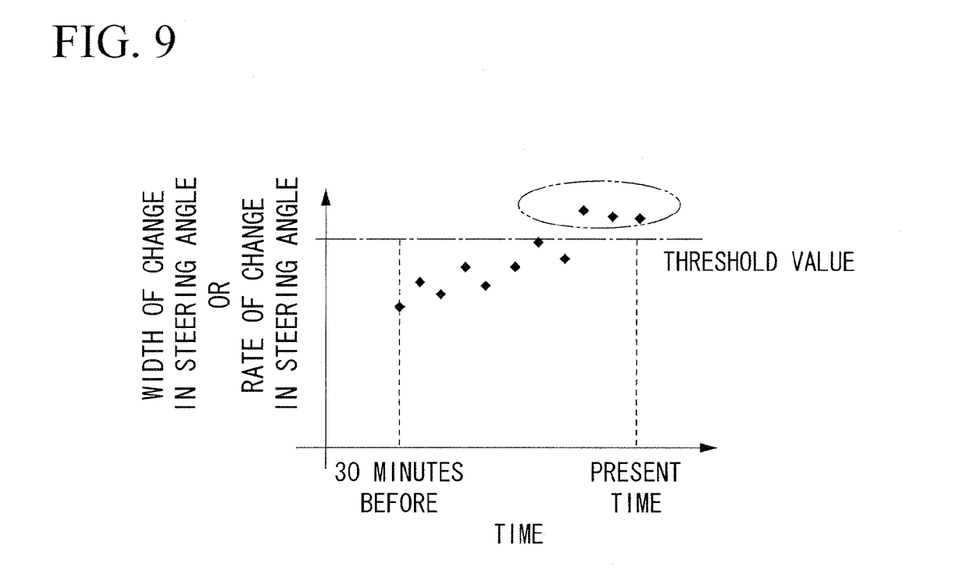
FIG. 9 is a graph showing the change with time of the steering angle variation.

FIG. 8 and FIG. 9 are graphs showing the change with time of width of change in steering angle or rate of change in steering angle. The description below takes the case of width of change in steering angle as an example. Wakefulness state and sleep state change gradually with time. The driver wakefulness estimating unit 26 reads the data of width of change in steering angle for a time period beginning at a predetermined time (for example, 30 minutes before the present time) to the present, from the data of width of change in steering angle stored in the past, in the memory device 28. As shown in FIG. 8, the approximated straight line of the data of width of change in steering angle that has been read, is determined by methods such as the least square method. When the inclination of the approximated straight line is positive, and the width of change in steering angle increases with time, the normality of the steering retention state of the driver is estimated be in a decreasing trend. In this case, the driver is judged as being in the state of low wakefulness (S20).

As shown in FIG. 9, the threshold value for estimating wakefulness related to width of change in steering angle is set in advance.

The read data of width of change in steering angle and the threshold value are compared; if the number of times the data of width of change in steering angle becomes below the threshold, is greater than a predetermined value (for example, 3 in FIG. 9), the frequency at which the driver is not retaining the steering wheel in the normal state may be estimated to be high. In this case also, the driver is judged to be in the state of low wakefulness (S20). In all other cases, the driver is judged as not being in a state of low wakefulness (S18).

Similar to the width of change in steering angle mentioned above, the wakefulness of the driver can also be estimated from the rate of change in steering angle. The estimation of wakefulness of the driver by width of change in steering angle and the estimation of wakefulness of the driver by rate of change in steering angle may both be implemented, or any of the two may be implemented. Moreover, the estimation of wakefulness of the driver by FIG. 8 and the estimation of wakefulness of the driver by FIG. 9 may both be implemented or any one of the two may be implemented.

When the driver is judged to be in the state of low wakefulness in S20, the system to reduce the risk of accident is activated in S22. For example, a warning alarm is given to the driver by the alarm device 34 of the accident risk reduction device 32. For the method of the warning alarm: a buzzer sound may be used; the cabin light or the instrument panel light may be lit or may blink; the front windshield may be illuminated from within the cabin; the seat belt, the seat, or the accelerator pedal, or the like may be vibrated; a counter-force may be given to the steering, changing the steering angle. In this way, the wakefulness of the driver can be improved.

(Correct Course Keeping Method)

Next, correct course keeping method is described below. The correct course of the vehicle is the course to be taken by the vehicle judging from the state of the surroundings such as roads and obstacles, and includes the cruising lane of the vehicle. When such correct course keeping becomes difficult, risk of traffic accident arises. In this case, measures are taken to facilitate the activation of a system to reduce the risk of an accident. More specifically, the timing to activate the alarm device 34 and the steering control device 36 is made 0.5 seconds earlier than in the normal case. As a result, even if the driver is not holding the steering wheel normally, or if the driver wakefulness has reduced, the deviation of the vehicle from the correct route can be prevented.

As described above, the steering wheel retention state judging device according to the present embodiment includes a torque application unit 14 for applying torque on a vehicle's steering wheel 12, an angle sensor 18 to detect the steering angle of the steering wheel 12, and a steering retention state judging unit 24 to judge the steering retention state of driver based on the steering angle of the steering wheel 12 detected by the angle sensor 18 when a torque is applied by the torque application unit 14.

According to this configuration, even on straight roads with small frequency of operation of the steering wheel 12, a torque can be applied on the steering wheel 12 by the torque application unit 14. Thus, from the relationship between steering angle change, which is the output, and the applied torque amount, which is the input, the steering retention state of the driver can be accurately judged.

The steering retention state judging unit 24 is configured to judge the driver is not maintaining the steering wheel normally, when the width of change in steering angle or the rate of change in steering angle is greater than a predetermined threshold value.

If the width of change in steering angle or the rate of change in steering angle is large, it can be judged to be highly possible that, either the gripping force on the steering wheel by the driver is smaller compared to the normal case, or the driver's hands are not on the steering wheel; therefore, it can be judged that the driver is not maintaining the steering wheel normally. Consequently, the steering retention state of the driver can be judged accurately.

On the other hand, the driver wakefulness estimating unit 26 according to the present embodiment is configured such that it judges that the driver's wakefulness has reduced when the width of change in steering angle or the rate of change in steering angle increases over a period of time.

Moreover, it was configured to judge that the driver wakefulness decreases when the width of change in steering angle or the rate of change in steering angle is judged greater than the threshold value, for a number of times that was greater than a predetermined number of times.

If the width of change in steering angle or the rate of change in steering angle increases over a period of time, the normality of the steering retention state is in a decreasing trend, and the driver wakefulness can be judged as having decreased. Moreover, if the number of times the width of change in steering angle or the rate of change in steering angle judged to be greater than the threshold value is greater than the predetermined number of times, the frequency that the steering wheel is not maintained normally is large, so the driver wakefulness can be judged to be reduced. Accordingly, the wakefulness of the driver can be estimated accurately.

(Second Embodiment)

Next, the steering retention state judging method, and the driver wakefulness estimating method according to the second embodiment are described below. In the first embodiment, the steering retention state of the driver was judged based on the steering angle accompanying the applied torque. The second embodiment, however, differs in that the judgment of the steering retention state of the driver is based on the steering torque of the driver in response to the externally applied torque. The block diagram of FIG. 1 and the flow chart of FIG. 3 are also applicable to the second embodiment. Detailed explanations of parts with the same configuration as the first embodiment are omitted here.

Figure 6A:
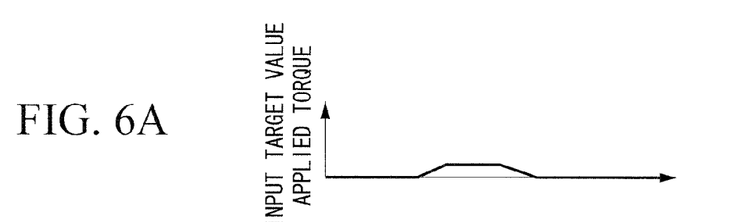
FIG. 6A is a graph showing an input waveform in the second embodiment.
Figure 6B:
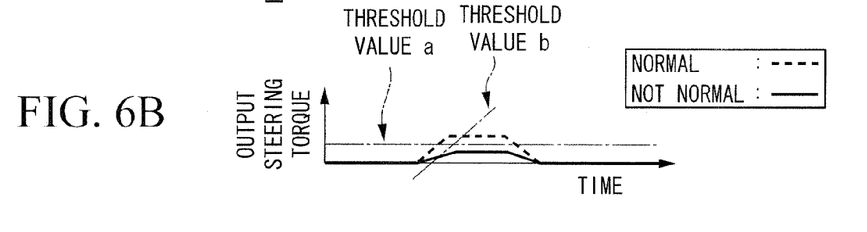
FIG. 6B is a graph showing an output waveform in the second embodiment.

FIG. 6A and FIG. 6B are graphs showing the steering input/output relationship of the second embodiment. When a torque is applied on the steering wheel 12 through the torque application unit 14, the steering torque can be detected from the driver's gripping state of the steering wheel. More specifically, the driver applies a steering torque as shown in FIG. 6B to the steering wheel 12 corresponding to the applied torque as shown in FIG. 6A. At this stage, the ECU 22 outputs a drive signal to the torque sensor 16, and the torque sensor 16 detects the steering torque (S14). The torque sensor 16 detects the steering torque at predetermined time points, and based on this result, the ECU 22 calculates the amount of steering torque change in response to the applied torque (hereafter referred to as "width of change in steering torque") and the amount of change in steering torque per unit time (hereafter referred to as "rate of change in steering torque.") The calculated width of change in steering torque and the calculated rate of change in steering torque are stored in the memory device 28.

When the steering retention state is normal, the driver applies a steering torque adequate to cancel the applied torque, so the steering torque increases as shown by the broken line in FIG. 6B.

As the torque applied by the torque application unit increases, the steering torque required to cancel the applied torque increases. In contrast, when the steering retention state of the driver is not normal, the steering torque decreases, as shown by the solid line in FIG. 6B.

Therefore, the threshold value 'a' of the width of change in steering torque is set in advance, based on the magnitude of the applied torque by the torque application unit, by the steering retention state judging unit 24. The width of change in steering torque calculated by the ECU 22 and the threshold value 'a' are compared. If the width of change in steering torque is smaller than the threshold value 'a', the steering retention state of the driver is judged as not normal.

When the steering retention state of the driver is normal, the driver operates the steering torque immediately, and the rate of change in steering torque increases, as shown by the broken line in FIG. 6B. As the torque applied by the torque application unit increases, the rate of change in steering torque increases. In contrast, when the steering retention state of the driver is not normal, the steering operation is delayed, and the rate of change in steering torque decreases, as shown by the solid line in FIG. 6B.

So the threshold value 'b' of the rate of change in steering torque is set in advance, based on the magnitude of the torque applied by the torque application unit. The rate of change in steering torque calculated by the ECU 22 and the threshold value 'b' are compared. If the rate of change in steering torque is smaller than the threshold value 'b', the steering retention state of the driver is judged as not normal. The judgment on steering retention state by the width of change in steering torque (threshold value 'a') and the judgment on steering retention state by the rate of change in steering torque (threshold value 'b') mentioned above can both be implemented, or either one of the two may be implemented.

Next, the driver wakefulness is estimated (S17).

Figure 10:
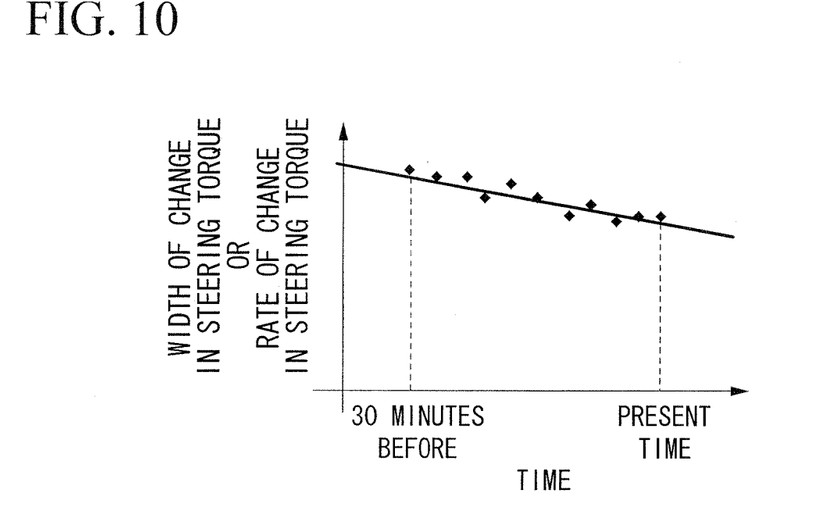
FIG. 10 is a graph showing the change with time of the steering torque variation.
Figure 11:
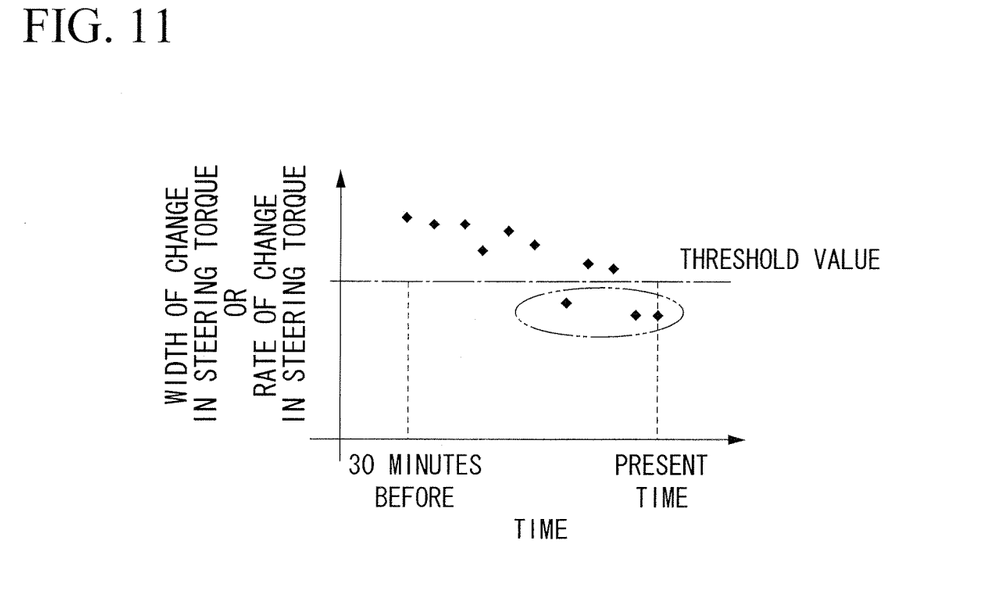
FIG. 11 is a graph showing the change with time of the steering torque variation.

FIG. 10 and FIG. 11 are graphs showing the change with time of the width of change in steering torque or the rate of change in steering torque. The width of change in steering torque is taken as an example in the description below. Wakefulness state and sleep state change gradually with time. The driver wakefulness estimating unit 26 reads the data of width of change in steering torque far a time period beginning at a predetermined time (for example, 30 minutes before the present time) to the present time, from the data of width of change in steering torque stored in the past, stored in the memory device 28. As shown in FIG. 10, the approximate straight line of the read data of width of change in steering torque is determined by methods such as the method of least squares. When the inclination of the approximated straight line is negative, and the width of change in steering torque decreases, the normality of the steering retention state of the driver is estimated to be in a decreasing trend. In this case, the driver is judged as being in the state of low wakefulness (S20).

As shown in FIG. 11, a threshold value for estimating wakefulness related to the width of change in steering torque is set in advance. The read data of width of change in steering torque and the threshold value are compared; if the number of times the data of width of change in steering torque becomes below the threshold value is greater than a predetermined value (for example, 3 in FIG. 11), the frequency at which the driver is not retaining the steering wheel in the normal state is estimated to be high. In this case also, the driver is judged as being in the state of low wakefulness (S20). In all other cases, the driver is judged as being not in the state of low wakefulness (S18).

Similar to the case of width of change in steering torque mentioned above, the wakefulness of the driver can also be estimated from the rate of change in steering torque. The estimation of wakefulness of the driver by the width of change in steering torque and the estimation of wakefulness of the driver by the rate of change in steering torque may both be implemented, or any one of the two may be implemented. Moreover, the estimation of wakefulness of the driver by FIG. 10 and the estimation of wakefulness of the driver by FIG. 11 may both be implemented or any one of the two may be implemented.

As described above, the steering wheel retention state judging device according to the second embodiment includes a torque application unit 14 for applying torque on a vehicle's steering wheel 12, a torque sensor 16 to detect the steering torque on the steering wheel 12 by the driver, and a steering retention state judging unit 24 to judge the steering retention state of the driver based on the steering torque detected by the torque sensor 16 when torque is applied by the torque application unit 14.

According to this configuration, even on straight roads with small frequency of operation of the steering wheel 12, a torque is applied on the steering wheel 12 by the torque application unit 14, causing the driver to apply a steering torque on the steering wheel 12 in order to cancel the externally applied torque. At this stage, variation in magnitude of the steering torque applied on the steering wheel 12 occurs due to the steering retention state of the driver. Consequently, the steering retention state of the driver can be judged accurately based on the steering torque when torque is applied.

Also, the steering retention state judging unit is configured to judge that the driver is not holding the steering wheel normally when the width of change in steering torque or the rate of change in steering torque is smaller than a predetermined threshold value.

When the width of change in steering torque or the rate of change in steering torque is small, the driver is applying the steering torque slowly, so the driver can be judged as not maintaining the steering wheel normally. Consequently, the steering retention state of the driver can be judged accurately.

The driver wakefulness estimating unit according to the present embodiment is configured so as to judge that the driver's wakefulness is reduced when the width of change in steering torque or the rate of change in steering torque decreases over a period of time. Moreover, the driver wakefulness estimating unit is configured to judge that the driver wakefulness is decreased, when the number of times wherein the width of change in steering torque or the rate of change in steering torque become smaller than a threshold value, is greater than a predetermined number of times.

If the width of change in steering torque or the rate of change in steering torque decreases over a period of time, the normality of the steering retention state is in a decreasing trend, and the driver wakefulness can be judged as decreased. Moreover, it can be judged that the driver wakefulness decreases when the number of times wherein the width of change in steering torque or the rate of change in steering torque is judged to be smaller than a threshold value, is greater than a predetermined number of times, since the frequency that the steering wheel is not maintained normally is increased. Accordingly, the wakefulness of the driver can be estimated accurately.

(Third Embodiment)

Next, the steering retention state judging method, and the driver wakefulness estimating method according to the third embodiment are described below. In the first embodiment, the steering retention state of the driver was judged based on the steering angle accompanying the applied torque. In the second embodiment, the steering retention state of the driver was judged based on the steering torque accompanying the applied torque. However, the third embodiment differs in that the steering retention state of the driver is judged based on the steering torque in response to the torque that is applied so as to obtain a target steering angle. The block diagram of FIG. 1 and the flow chart of FIG. 3 are also applicable to the third embodiment. The detailed explanations of parts with the same configuration as the first embodiment and the second embodiment are omitted here.

The torque application unit 14 of the third embodiment applies a torque on the steering wheel so that the steering angle becomes the target value. The correspondence relationship between the target steering angle and the applied torque are determined in advance by experiments by other methods.

Figure 7A:
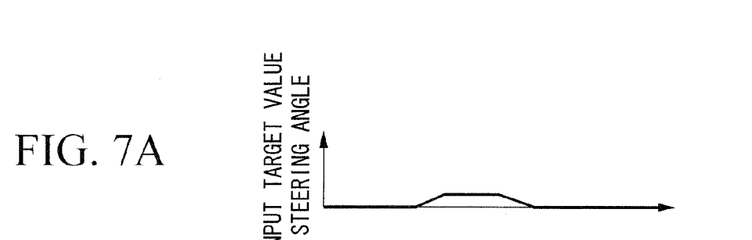
FIG. 7A is a graph showing an input waveform in the third embodiment.

When torque is applied to achieve the target steering angle through the torque application unit 14, the steering torque according to the driver's gripping state of the steering wheel can be detected. More specifically, the driver applies a steering torque as shown in FIG. 7B on the steering wheel 12 corresponding to the torque applied to achieve the target steering angle, as shown in FIG. 7A.

Figure 7B:
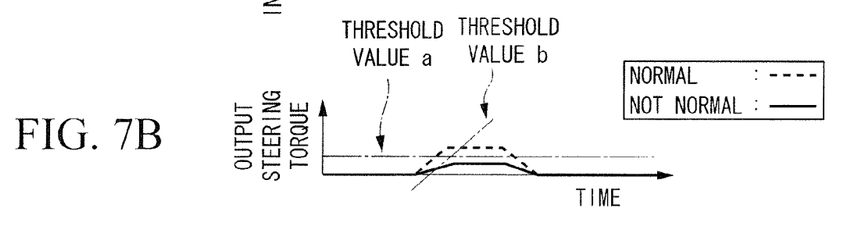
FIG. 7B is a graph showing an output waveform in the third embodiment.

When the steering retention state is normal, the driver applies a steering torque adequate to cancel the externally applied torque, so the steering torque increases as shown by the broken line in FIG. 7B.

The greater the target steering angle, the greater the steering torque becomes. In contrast, when the steering retention state of the driver is not normal, the steering torque decreases, as shown by the solid line in FIG. 7B.

Therefore, the threshold value 'a' of the width of change in steering torque is set in advance based on the magnitude of the target steering angle by the steering retention state judging unit 24. The width of change in steering torque calculated by the ECU 22 and the threshold value 'a' are compared. If the width of change in steering torque is smaller than the threshold value 'a', the steering retention state of the driver is judged as not normal.

When the steering retention state of the driver is normal, the driver applies the steering torque immediately, therefore, the rate of change in steering torque increases, as shown by the broken line in FIG. 7B. The greater the target steering angle, the greater the rate of change in steering torque becomes. In contrast, when the steering retention state of the driver is not normal, the driver applies the steering torque slowly, therefore, the rate of change in steering torque decreases, as shown by the solid line in FIG. 7B.

The threshold value 'b' of the rate of change in steering torque is set in advance based on the magnitude of the target steering angle. The rate of change in steering torque calculated by the ECU 22 and the threshold value 'b' are compared. If the rate of change in steering torque is smaller than the threshold value 'b', the steering retention state of the driver is judged as not normal. The judgment on steering retention state by the width of change in steering torque (threshold value 'a') and the judgment on steering retention state by the rate of change in steering torque (threshold value 'b') mentioned above can both be implemented, or either one of the two may be implemented.

The driver wakefulness estimating method according to the third embodiment can be implemented similarly to the second embodiment as in FIG. 10 and/or in FIG. 11.

As described above, the steering wheel retention state judging device according to the third embodiment includes: a torque application unit 14 for applying torque on a vehicle's steering wheel such that the steering angle becomes equal to the target value; a torque sensor 16 to detect the steering torque of the steering wheel 12 by the driver; and a steering retention state judging unit 24 to judge the steering retention state of the driver based on the steering torque detected by the torque sensor 16 when a torque is applied by the torque application unit 14.

According to this configuration, even on straight roads with small frequency of operation of the steering wheel 12 by the driver, a torque can be applied by the torque application unit 14 such that the target steering angle is achieved, and the driver applies the steering torque such that the externally applied torque is canceled. At this stage, variation in magnitude of the steering torque applied on the steering wheel 12 occurs due to the steering retention state of the driver. Consequently, the steering wheel retention state of the driver can be judged accurately based on the steering torque when external torque is applied.

The present invention is not limited by the embodiments described above.

For instance, a device other than the correct course-keeping device may be used as the steering control device. Also for example, a device for enhancing stability in a straight line of a vehicle or a device for enhancing the behavioral stability of a vehicle may be employed. Devices other than alarm device and steering control device may be employed as accident risk reduction devices. For example, if a vehicle is at risk of collision with an obstacle in the surroundings: a device for activating the brake: a device for maintaining the vehicle at an appropriate speed; a device for controlling the vehicle so that an appropriate distance is maintained from vehicles in the surroundings; a device that issues alerts in the surroundings; or a device that enhances the wakefulness of the driver may be employed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A driver wakefulness estimating device comprising:
a steering wheel retention state judging device comprising:
a torque application unit that applies a torque on a steering wheel of a vehicle;
an angle sensor that detects a steering angle of the steering wheel; and a steering wheel retention state judging unit that judges a retention state of the steering wheel by the driver, based on the steering angle of the steering wheel when the torque is applied by the torque application unit;

a memory device that stores a plurality of changes in the steering angle or changes in the steering angle per unit time, in response to the torque applied by the torque application unit; and a driver wakefulness estimating unit that estimates the driver's wakefulness as being decreased when the change in the steering angle or the change in the steering angle per unit time, in response to the torque applied by the torque application unit, increases over a period of time.

2. The driver wakefulness estimating device according to claim 1, wherein the steering wheel retention state judging unit judges that the driver does not retain the steering wheel normally when a change in steering angle or a change in steering angle per unit time, in response to the torque applied by the torque application unit, becomes equal to or greater than a predetermined value.

3. A driver wakefulness estimating device comprising:
a steering wheel retention state judging device comprising:
a torque application unit that applies a torque on a steering wheel of a vehicle;
an angle sensor that detects a steering angle of the steering wheel; and
a steering wheel retention state judging unit that judges a retention state of the steering wheel by the driver, based on the steering angle of the steering wheel when the torque is applied by the torque application unit; and a driver wakefulness estimating unit that estimates the driver's wakefulness as being decreased when a change in the steering angle or a change in steering angle per unit time, in response to the torque applied by the torque application unit, becomes on or above a threshold value for a number of times that is greater than a predetermined number of times.

4. The driver wakefulness estimating device according to any one of claims 1 and 3, that operates the steering wheel retention state judging device to judge the steering wheel retention state when a steering frequency of the driver is on or below a predetermined value.

5. The driver wakefulness estimating device according to any one of claims 1 and 3, wherein, when the torque is applied by the torque application unit, a connection between the steering wheel and a vehicle wheel is disconnected, so that the steering wheel rotates independently of the vehicle wheel.

6. The driver wakefulness estimating device according to any one of claims 1 and 3, further comprising an alarm device which is activated when the driver wakefulness is estimated to be decreased.

7. The steering wheel retention state judging device according to claim 1, wherein the torque application unit applies a torque so as to cancel out the steering angle by the driver, when the amount of the steering angle is equal to or below a predetermined value.

8. The steering wheel retention state judging device according to claim 3, wherein the torque application unit applies a torque so as to cancel out the steering angle by the driver, when the amount of the steering angle is equal to or below a predetermined value.

9. The driver wakefulness estimating device according to claim 3, wherein the steering wheel retention state judging unit judges that the driver does not retain the steering wheel normally when a change in steering angle or a change in steering angle per unit time, in response to the torque applied by the torque application unit, becomes equal to or greater than a predetermined value.

10. A correct course keeping device comprising:
a driver wakefulness estimating device comprising:
a steering wheel retention state judging device comprising:
a torque application unit that applies a torque on a steering wheel of a vehicle;
an angle sensor that detects a steering angle of the steering wheel; and
a steering wheel retention state judging unit that judges a retention state of the steering wheel by the driver, based on the steering angle of the steering wheel when the torque is applied by the torque application unit;
a memory device that stores a plurality of changes in the steering angle or changes in the steering angle per unit time, in response to the torque applied by the torque application unit; and
a driver wakefulness estimating unit that estimates the driver's wakefulness as being decreased when the change in the steering angle or the change in the steering angle per unit time, in response to the torque applied by the torque application unit, increases over a period of time; and
an alarm device or a steering control device,
wherein the alarm device or the steering control device is activated when a probability of the vehicle deviating from a correct course becomes higher than a predetermined probability, and
conditions under which the alarm device or the steering control device is activated are broadened when the wakefulness estimating unit estimates that the driver's wakefulness is decreased.

11. A correct course keeping device comprising:
a steering wheel retention state judging device comprising:
a torque application unit that applies a torque on a steering wheel of a vehicle;
an angle sensor that detects a steering angle of the steering wheel; and
a steering wheel retention state judging unit that judges a retention state of the steering wheel by the driver, based on the steering angle of the steering wheel when the torque is applied by the torque application unit;
a driver wakefulness estimating unit that estimates the driver's wakefulness as being decreased when a change in the steering angle or a change in steering angle per unit time, in response to the torque applied by the torque application unit, becomes on or above a threshold value for a number of times that is greater than a predetermined number of times; and
an alarm device or a steering control device,
wherein the alarm device or the steering control device is activated when a probability of the vehicle deviating from a correct course becomes higher than a predetermined probability, and
conditions under which the alarm device or the steering control device is activated are broadened when the wakefulness estimating unit estimates that the driver's wakefulness is decreased.

* * * * *